United States Patent
Bierl et al.

(10) Patent No.: US 9,079,253 B2
(45) Date of Patent: Jul. 14, 2015

(54) ROTATING SHAFT TOOL

(75) Inventors: Wolfgang Bierl, Gueglingen (DE); Bastian Hilty, Dulliken (CH)

(73) Assignee: KOMET GROUP GMBH, Besigheim (DE)

( * ) Notice: Subject to any disclaimer, the term of this patent is extended or adjusted under 35 U.S.C. 154(b) by 1105 days.

(21) Appl. No.: 12/737,978

(22) PCT Filed: Aug. 20, 2009

(86) PCT No.: PCT/EP2009/060782
§ 371 (c)(1),
(2), (4) Date: Apr. 12, 2011

(87) PCT Pub. No.: WO2010/026055
PCT Pub. Date: Mar. 11, 2010

(65) Prior Publication Data
US 2011/0182679 A1 Jul. 28, 2011

(30) Foreign Application Priority Data
Sep. 4, 2008 (DE) .......................... 10 2008 045 675

(51) Int. Cl.
*B23D 77/00* (2006.01)
*B23B 31/02* (2006.01)
(Continued)

(52) U.S. Cl.
CPC ............. *B23B 31/026* (2013.01); *B23C 5/1081* (2013.01); *B23D 77/003* (2013.01);
(Continued)

(58) Field of Classification Search
CPC B23B 31/026; B23B 27/002; B23B 2250/16; B23C 2250/16; B23D 77/003; B23D 77/04; B23D 77/044; B23D 2277/088; B23D 2277/10

USPC ........... 408/143, 147, 153, 154, 156; 409/141
See application file for complete search history.

(56) References Cited

U.S. PATENT DOCUMENTS

| 3,261,236 A | 7/1966 | Flannery |
| 4,813,831 A | 3/1989 | Reinauer |

(Continued)

FOREIGN PATENT DOCUMENTS

| DE | 34 33 878 A1 | 3/1986 |
| DE | 37 15 659 A1 | 9/1988 |

(Continued)

OTHER PUBLICATIONS

Form PCT/IPEA/416 Notification of Transmittal of International Preliminary Examination Report dated Feb. 22, 2011 (1 page).
(Continued)

*Primary Examiner* — Eric A Gates
(74) *Attorney, Agent, or Firm* — Flynn, Thiel, Boutell & Tanis, P.C.

(57) ABSTRACT

A shaft tool for machine tools, has a shaft, a tool head disposed at a shaft end and equipped with at least one cutting element, and a coupling element disposed at the other shaft end for direct or indirect connection to a machine spindle. A peripheral groove extends along the circumference of the shaft and is open radially, and at least one spreading element engages in the peripheral groove and can be radially adjusted therein, resulting in the exertion of spreading and bending forced onto the groove flanks. The peripheral groove is filled with a filler material at least in the area of the spreading element, the filler material having both a sealing function against contaminants and a damping function. The filler material also acts as a rotation prevention for the spreading elements.

10 Claims, 3 Drawing Sheets

(51) Int. Cl.
*B23C 5/10* (2006.01)
*B23D 77/04* (2006.01)

(52) U.S. Cl.
CPC ............ *B23D 77/04* (2013.01); *B23B 2250/16* (2013.01); *B23C 2240/24* (2013.01); *B23C 2260/04* (2013.01); *B23D 2277/088* (2013.01); *B23D 2277/10* (2013.01); *B23D 2277/60* (2013.01); *Y10T 407/1946* (2015.01); *Y10T 408/76* (2015.01); *Y10T 408/858* (2015.01)

(56) References Cited

U.S. PATENT DOCUMENTS

| | | | |
|---|---|---|---|
| 5,116,171 | A | 5/1992 | Gerk et al. |
| 5,286,042 | A * | 2/1994 | Laube ............................ 279/133 |
| 5,540,527 | A | 7/1996 | Bohnet et al. |
| 6,345,942 | B1 * | 2/2002 | Cook ............................. 409/131 |
| 6,557,445 | B1 * | 5/2003 | Ishikawa ......................... 82/158 |
| 7,393,164 | B2 * | 7/2008 | Chen ............................. 409/141 |
| 7,455,487 | B2 * | 11/2008 | Chang ............................ 408/143 |
| 7,938,408 | B2 * | 5/2011 | Haimer .......................... 279/102 |
| 2002/0067961 | A1 * | 6/2002 | Yewman ......................... 407/30 |
| 2003/0138303 | A1 | 7/2003 | Baxivanelis et al. |

FOREIGN PATENT DOCUMENTS

| | | | |
|---|---|---|---|
| DE | 44 00 425 | A1 | 7/1995 |
| DE | 20 2006 000 914 | U1 | 3/2006 |
| EP | 0 187 647 | A2 | 7/1986 |
| EP | 0 656 240 | A1 | 6/1995 |
| EP | 1 080 832 | A2 | 3/2001 |
| EP | 1 757 391 | A1 | 2/2007 |
| GB | 2 164 276 | A | 3/1986 |
| GB | 2 356 828 | A | 6/2001 |
| JP | 10138011 | A * | 5/1998 |
| JP | 2003145378 | A * | 5/2003 |
| SU | 986622 | A * | 1/1983 |

OTHER PUBLICATIONS

Form PCT/IPEA/409 International Preliminary Examination Report dated Feb. 22, 2011 (10 pages).
Form PCT/ISA/210 International Search Report dated Nov. 17, 2009 (4 pages) with English translation of Categories of Documents Cited.
Germany Patent Office Search Report dated Feb. 27, 2009 (4 pages) with English translation of p. 2.

* cited by examiner ial adjustment in both directions, the tool shank is elastically preloaded, in the region of the circumferential groove, in the bending direction counter to the spreading action of the spreading elements. The preload may be generated either by means of mechanical and thermal material treatment in the groove region of the tool shank or by means of the formation of a circumferential groove which, at its groove base, is eccentric with respect to the shank axis.

ROTATING SHAFT TOOL

The invention relates to a shank-type tool for machine tools, having a shank, a tool head which is arranged on one shank end and which is equipped with at least one cutting element, and a coupling element, which is arranged on the other shank end, for directly or indirectly attaching to a machine spindle.

Rotating tools of this type are designed for example for fine cutting machining of internal surfaces. It has been found that inaccuracies in the machine spindle and the tool receptacle thereof and on the tool itself can, in the case of shank-type tools, add up to inadmissible run-out errors. To eliminate errors of this type, use is made in practice of balancing holders which have an actuating mechanism which effects a radial displacement of the coupling axis and of the tool axis. Said actuating mechanism is conventionally a component which is separate from the shank-type tool and which has relatively large dimensions and is of complex design.

Taking this as a starting point, the object on which the invention is based is that of developing a shank-type tool of the type specified in the introduction which, with relatively little expenditure, permits a radial compensation for the elimination of run-out errors.

To achieve said object, the features specified in the claims are disclosed. Advantageous embodiments and refinements of the invention emerge from the dependent claims.

The solution according to the invention is based on the concept that the adjusting mechanism for the radial adjustment can be integrated in the shank-type tool itself. To permit this, it is proposed according to the invention that the shank has a radially open circumferential groove extending over the shank circumference and has at least one spreading element which engages into the circumferential groove and which is radially adjustable therein so as to exert spreading and bending forces on the groove flanks. Here, the circumferential groove has the function of providing that the coupling side and the tool head side can be bent relative to one another, but that at the same time the rigid connection in the central core region of the shank-type tool is maintained.

In one preferred embodiment of the invention, the at least one spreading element has a threaded section which engages into an internal thread which is formed into the groove flanks and which is interrupted by the circumferential groove. Here, in one preferred embodiment of the invention, the threaded section of the at least one spreading element and of the internal thread are of complementary conical design.

In addition or alternatively to this, the at least one spreading element may have a cone tip which is supported in the interior of the circumferential groove on the groove flanks, wherein the groove flanks themselves may form wedge surfaces complementary to the cone tip. To ensure that the spreading of the groove flanks takes place with low stresses, the encircling groove has a groove base which is concavely curved transversely with respect to the circumferential direction.

A radial adjustment of the tool head relative to the coupling end in any desired direction is made possible by virtue of a plurality of separately adjustable spreading elements being arranged along the circumferential groove with a spacing to one another. At least four spreading elements are advantageously provided which are expediently arranged with equal angular spacings to one another. It is basically possible for the number of spreading elements to be adapted to the required run-out accuracy, wherein it must be taken into consideration that the adjustment expenditure becomes greater the more spreading elements are provided distributed over the circumference.

Particularly simple actuation is made possible if only two spreading elements are provided which are arranged with an angular spacing to one another not equal to 180°. The spreading elements advantageously have an angular spacing of 90° to one another on one side and an angular spacing of 270° to one another on the other side. To nevertheless permit a two-dimensional adjustment in both directions, the tool shank is elastically preloaded, in the region of the circumferential groove, in the bending direction counter to the spreading action of the spreading elements. The preload may be generated either by means of mechanical and thermal material treatment in the groove region of the tool shank or by means of the formation of a circumferential groove which, at its groove base, is eccentric with respect to the shank axis.

In a further preferred embodiment of the invention, the circumferential groove is filled with a filler material at least in the region of the spreading elements. Here, the filler material may be inserted into the circumferential groove in the form of a ring or in the form of ring segments. As an alternative to this, the filler material may be introduced into the circumferential groove in the form of a casting compound. Use is expediently made of a filler material composed of a ductile, abrasion-resistant and adherent material. The filler material is preferably composed of an elastic material, preferably of an elastomeric plastic.

The filler material firstly has a sealing function, by means of which the infiltration of contaminants into the encircling groove is prevented. A further function of the filler material consists in providing rotational locking for the adjusting screws screwed into the threaded sections. Furthermore, the filler material has a vibration-damping effect, in particular if it is composed of an elastomeric material.

In a further preferred embodiment of the invention, the shank of the shank-type tool is of substantially cylindrical design, it being possible for the shank to have a radially thickened portion in the region of the circumferential groove.

The opening width of the circumferential groove is also not of significance for the adjustment function itself. It is basically also possible for the circumferential groove to be designed to be so narrow that filling it with filler material is made superfluous. The narrow circumferential groove may for example be formed by wire erosion. In this way it is possible to produce even a groove width of less than 0.3 mm.

BRIEF DESCRIPTION OF THE DRAWINGS

The invention will be explained in more detail below on the basis of the exemplary embodiments schematically illustrated in the drawing, in which:

FIG. 4a shows a longitudinal section through the shank-type tool as per FIG. 1 with the adjusting screws screwed in;

DETAILED DESCRIPTION

Figure 1:
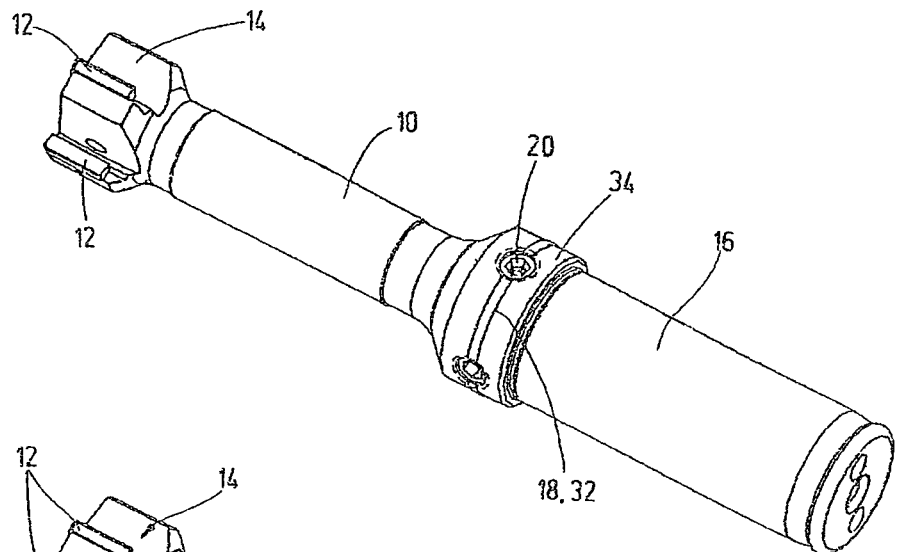
FIG. 1 shows a diagrammatic illustration of a shank-type tool which is designed as a reamer and which has an integrated alignment mechanism.
Figure 2:
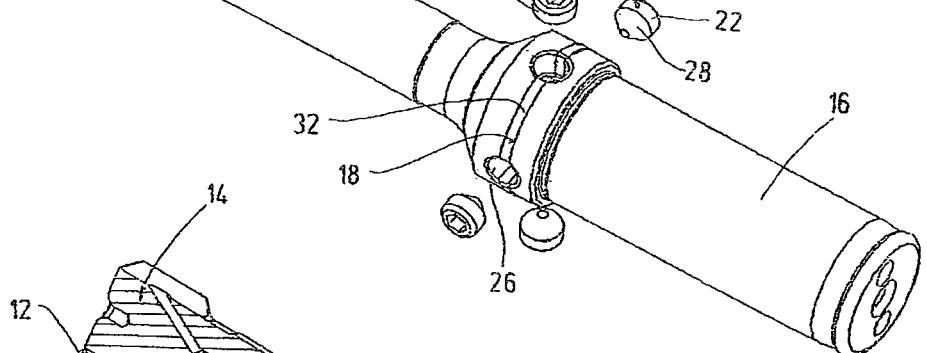
FIG. 2 shows the shank-type tool as per FIG. 1 with unscrewed cylindrical adjusting screws with conical tips.
Figure 3:
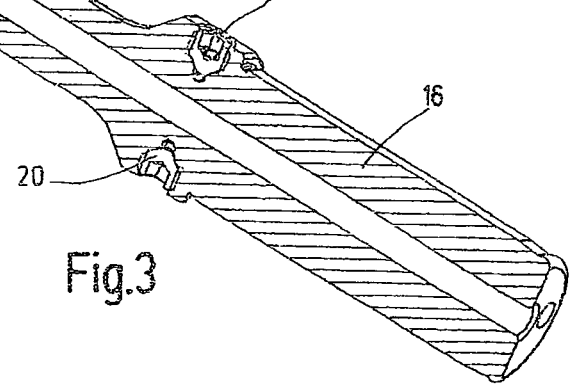
FIG. 3 shows a longitudinal section through the shank-type tool as per FIG. 1 in a diagrammatic illustration.
Figure 4A:
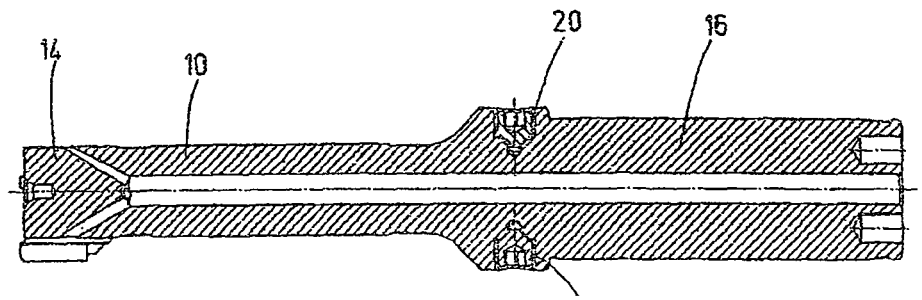
Figure 4B:
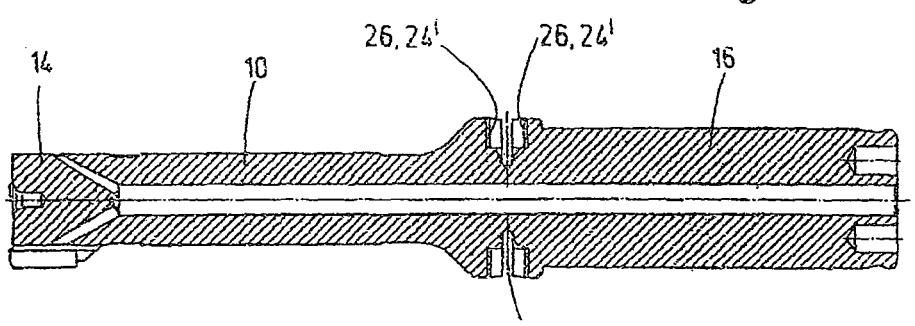
FIG. 4b shows a longitudinal section corresponding to FIG. 4a with the adjusting screws unscrewed.
Figure 4C:
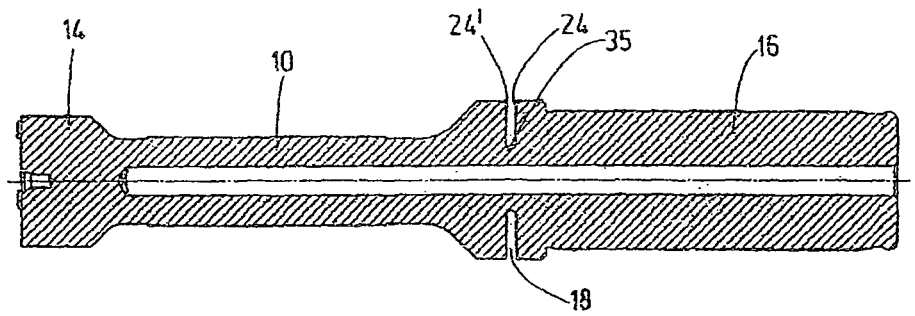
FIG. 4c shows a longitudinal section through the shank-type tool in a section plane without adjusting screws and with open encircling groove.
Figure 4D:
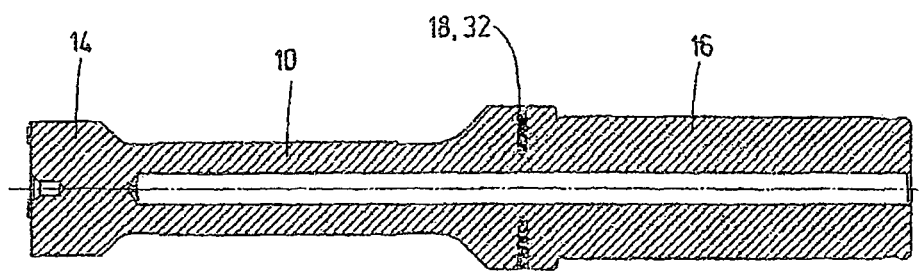
FIG. 4d shows an illustration corresponding to FIG. 4c with filler material in the groove.

The rotating shank-type tools illustrated in the drawing are reamers designed for use in machine tools. The shank-type tools have a shank 10, a tool head 14 which is arranged on one shank end and which is equipped with a plurality of cutting elements 12, and a coupling element 16, which is arranged on the other shank end, for directly or indirectly attaching to a machine spindle (not illustrated).

A peculiarity of the shank-type tools is that the shank 10 has, in its central region, a radially open circumferential groove 18 which extends over the circumference of the shank and which has a concavely curved groove base 35, into which are inserted a plurality of radially adjustable spreading elements 20 which have a spacing to one another in the circumferential direction. The spreading elements 20 have a threaded section 22 which engages in each case into an internal thread 26 which is formed into the groove flanks 24', 24" and which is interrupted by the circumferential groove 18. The tool shank 10 is of substantially cylindrical design. Said tool shank 10 has a radially thickened portion 34 in the region of the encircling groove.

In the exemplary embodiment shown in FIGS. 1 to 4, the threaded section 22 of the spreading elements is of cylindrical design, while the internal threads 26 in the groove flanks complement one another so as to form a complementary internal cylinder. Furthermore, the spreading elements 20 have a conical tip 28 which bears against a complementary internal cone 30, which is divided by the encircling groove, in the region of the groove flanks. During the radial adjustment of the spreading elements 20, a spreading force is in this case exerted by means of the respective cone tips 28 on the groove flanks 24', 24" in the region of the internal cone 30, which results in a radial adjustment of the tool head 14 relative to the coupling element 16. Since a total of four spreading elements 20 are provided which are arranged distributed over the circumference, it is possible by means of the actuation thereof for an axially parallel alignment of the tool head 14 with the coupling element 16 to be carried out in any desired radial direction, by means of which any run-out errors of the tool clamped in a tool spindle or in an adapter is possible.

Figure 5:
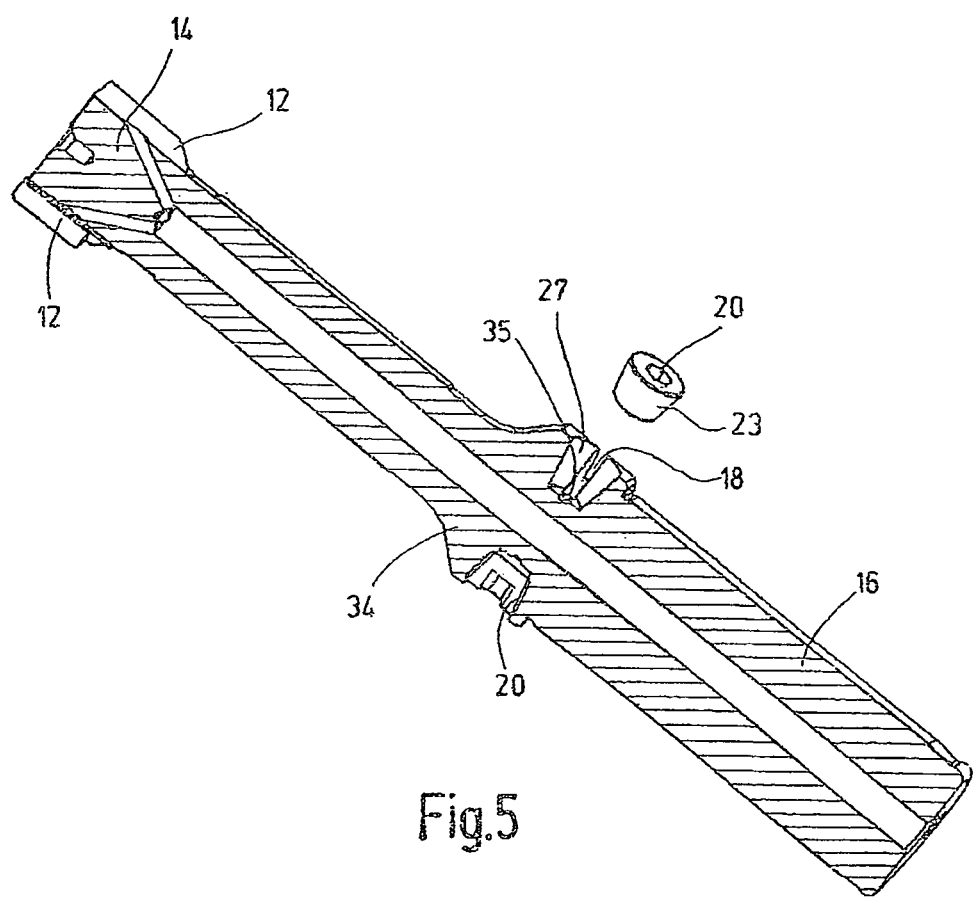
FIG. 5 shows a section through a shank-type tool corresponding to FIG. 3, with conical adjusting screws.

The exemplary embodiment shown in FIG. 5 differs from the exemplary embodiment according to FIGS. 1 to 4 in that the spreading elements 20 have a conical threaded section 23, while the internal thread 27, which is divided by the circumferential groove 18, in the groove flanks 24', 24" is likewise of conical design. The conical threaded section 23 ensures that, when the spreading elements 20 are screwed in, spreading and bending forces are exerted on the groove flanks 24', 24", which spreading and bending forces permit an alignment of the tool head 14 relative to the coupling element 16.

A further peculiarity of the invention is that the circumferential groove 18 is filled with a filler material 32 at least in the region of the spreading elements. Here, the filler material 32 may be inserted into the circumferential groove 18 in the form of a ring or in the form of ring segments, or may be introduced into the circumferential groove 18 in the form of a casting compound. The filler material 32 is expediently composed of a ductile, abrasion-resistant and adherent material, preferably of an elastomeric plastic. The filler material 32 firstly performs a sealing function with respect to contaminants from the outside. Said filler material 32 also serves to provide rotational locking of the spreading elements 20 such that these cannot become loosened from their internal threads on their own. Furthermore, the filler material has a vibration-damping effect on the rotating tool. By means of the spreading elements 20, it is possible for errors in the run-out accuracy of a long shank-type tool to be eliminated using simple means.

In all of the above-described exemplary embodiments, four spreading elements 20 have been provided which are arranged so as to be distributed over the circumference at intervals. It is basically possible for the number of spreading elements 20 to be adapted to the required run-out accuracy, wherein it must be taken into consideration that the adjusting expenditure is greater the more spreading elements 20 are provided distributed over the circumference.

It is basically also possible for two-dimensional adjustment to be attained by means of only two spreading elements with an angular spacing of 90° to one another if there is an elastic preload between the groove flanks in the opposite direction to the spreading action of the spreading elements. The preload may be generated either by means of mechanical and thermal material treatment in the groove region of the tool shank or by means of the formation of an eccentric circumferential groove. An improvement in this regard may be attained if filler material which influences the restoring action during the adjustment process is arranged in the circumferential groove.

In summary, the following can be stated: the invention relates to a shank-type tool for machine tools, having a shank 10, a tool head which is arranged on one shank end and which is equipped with at least one cutting element 12, and a coupling element 16, which is arranged on the other shank end, for directly or indirectly attaching to a machine spindle. A peculiarity of the invention is that the shank 10 has a radially open circumferential groove 18 extending over the shank circumference and has at least one spreading element 20 which engages into the circumferential groove and which is radially adjustable therein so as to exert spreading and bending forces on the groove flanks 24', 24". Here, the circumferential groove 18 is filled, at least in the region of the spreading elements 20, with a filler material 32 which performs both a sealing function with respect to contaminants and also a damping function. Furthermore, the filler material 32 serves to provide rotational locking of the spreading elements 20.

The invention claimed is:

1. A shank-type tool for machine tools, having a shank, a tool head which is arranged on one shank end and equipped with at least one cutting element, and a coupling element arranged on an opposite shank end for directly or indirectly attaching to a machine spindle, the shank having a radially open circumferential groove which extends around the shank circumference and at least one spreading element which engages into the circumferential groove and is radially adjustable therein so as to exert spreading and bending forces on flanks provided in the groove, wherein the circumferential groove is filled with a filler material in the form of a ductile, abrasion-resistant and adherent casting compound having a sealing function and providing rotational locking of the spreading elements.

2. The shank-type tool as claimed in claim 1, wherein the at least one spreading element has a threaded section which engages into an internal thread formed into the groove flanks and is interrupted by the circumferential groove.

3. The shank-type tool as claimed in claim 2, wherein the threaded section of the at least one spreading element and the internal thread are of complementary conical design.

4. The shank-type tool as claimed in claim 1, wherein the at least one spreading element has a cone tip which is supported in the interior of the circumferential groove on the groove flanks.

5. The shank-type tool as claimed in claim 1, wherein the circumferential groove has a groove base which is concavely curved transversely with respect to the circumferential direction.

6. The shank-type tool as claimed in claim 1, wherein a plurality of separately adjustable spreading elements are arranged along the encircling circumferential groove spaced apart from one another.

7. The shank-type tool as claimed in claim 1, wherein the filler material is inserted into the circumferential groove in the form of a ring or ring segments.

8. The shank-type tool as claimed in claim 1, wherein the filler material is composed of an elastic material.

9. The shank-type tool as claimed in claim 8, wherein the elastic material is an elastomeric plastic.

10. The shank-type tool as claimed in claim 1, characterized in that the tool shank is elastically preloaded, in the region of the circumferential groove, in the bending direction counter to the spreading action of the spreading elements.

* * * * *